(12) United States Patent
Ikriannikov et al.

(10) Patent No.: US 8,068,355 B1
(45) Date of Patent: *Nov. 29, 2011

(54) APPARATUS FOR ISOLATED SWITCHING POWER SUPPLY WITH COUPLED OUTPUT INDUCTORS

(75) Inventors: Alexandr Ikriannikov, Castro Valley, CA (US); Ognjen Djekic, Fremont, CA (US)

(73) Assignee: Volterra Semiconductor Corporation, Fremont, CA (US)

( * ) Notice: Subject to any disclaimer, the term of this patent is extended or adjusted under 35 U.S.C. 154(b) by 527 days.

This patent is subject to a terminal disclaimer.

(21) Appl. No.: 12/330,394

(22) Filed: Dec. 8, 2008

Related U.S. Application Data

(63) Continuation-in-part of application No. 11/756,972, filed on Jun. 1, 2007, now Pat. No. 7,463,498, which is a continuation of application No. 11/022,217, filed on Feb. 17, 2005, now Pat. No. 7,239,530.

(51) Int. Cl.
*H02M 3/335* (2006.01)

(52) U.S. Cl. .............................. 363/25; 363/16; 323/222

(58) Field of Classification Search .............. 363/16–20, 363/25, 28, 71, 80, 81, 97, 98, 132, 134; 323/272, 282–288, 222, 350, 351
See application file for complete search history.

(56) References Cited

U.S. PATENT DOCUMENTS

| | | | |
|---|---|---|---|
| 5,177,675 A | 1/1993 | Archer | |
| 5,204,809 A | 4/1993 | Andresen | |
| 5,359,180 A * | 10/1994 | Park et al. | 219/121.54 |
| 5,436,818 A | 7/1995 | Barthold | |
| 5,764,500 A | 6/1998 | Matos | |
| 6,018,468 A | 1/2000 | Archer et al. | |
| 6,307,757 B1 | 10/2001 | Porter et al. | |
| 6,348,848 B1 * | 2/2002 | Herbert | 336/178 |
| 6,362,986 B1 | 3/2002 | Schultz et al. | |
| 6,462,964 B2 | 10/2002 | Porter et al. | |
| 6,501,193 B1 * | 12/2002 | Krugly | 307/31 |
| 6,545,450 B1 | 4/2003 | Ledenev et al. | |
| 6,583,992 B2 | 6/2003 | Porter et al. | |
| 6,590,786 B2 | 7/2003 | Gurov | |
| 6,590,791 B1 | 7/2003 | Zhou et al. | |
| 6,686,727 B2 | 2/2004 | Ledenev et al. | |
| 6,694,438 B1 | 2/2004 | Porter et al. | |
| 6,696,823 B2 | 2/2004 | Ledenev et al. | |

(Continued)

FOREIGN PATENT DOCUMENTS

DE   10 2006 034 553    6/2007

(Continued)

OTHER PUBLICATIONS

Wong, Pit-Leong, et al., "A Novel Modeling Concept for Multi-Coupling Core Structures," Virginia Polytechnic Institute and State University, Blacksburg, VA, pp. 1-7, Jan. 2001.

(Continued)

*Primary Examiner* — Rajnikant Patel
(74) *Attorney, Agent, or Firm* — Lathrop & Gage LLP

(57) ABSTRACT

A multiphase DC-to-DC power converter has two or more sets of input switches, each set of input switches driving primary windings of at least one associated transformer. Each transformer has one or two secondary windings, the secondary windings feeding power through output switches or rectifiers through an associated output inductor into a common filter. At least two of the output inductors are magnetically coupled.

23 Claims, 12 Drawing Sheets

Figure 2

U.S. PATENT DOCUMENTS

| | | |
|---|---|---|
| 6,757,184 B2 | 6/2004 | Wei et al. |
| 6,784,644 B2 | 8/2004 | Xu et al. |
| 6,838,863 B2 | 1/2005 | Hazucha et al. |
| 6,934,167 B2 * | 8/2005 | Jang et al. .................. 363/21.02 |
| 6,979,980 B1 | 12/2005 | Hesterman et al. |
| 7,030,512 B2 | 4/2006 | Krein |
| 7,110,266 B1 | 9/2006 | Porter et al. |
| 7,199,695 B1 | 4/2007 | Zhou et al. |
| 7,233,132 B1 | 6/2007 | Dong et al. |
| 7,315,463 B2 | 1/2008 | Schrom et al. |
| 7,423,894 B2 | 9/2008 | Ilic |
| 7,504,808 B2 | 3/2009 | Schrom et al. |
| 2006/0012348 A1 | 1/2006 | Zhao et al. |
| 2006/0197510 A1 | 9/2006 | Chandrasekaran |
| 2007/0097571 A1 | 5/2007 | Dinh et al. |
| 2007/0175701 A1 | 8/2007 | Xu et al. |
| 2007/0176726 A1 | 8/2007 | Xu et al. |
| 2008/0150666 A1 | 6/2008 | Chandrasekaran et al. |
| 2008/0205098 A1 | 8/2008 | Xu et al. |
| 2009/0001945 A1 | 1/2009 | Wickersham et al. |

FOREIGN PATENT DOCUMENTS

| | | |
|---|---|---|
| EP | 0 755 060 | 1/1997 |
| JP | 11307369 | 5/1999 |

OTHER PUBLICATIONS

Wong, Pit-Leong, et al., "Investigating Coupling Inductors in the Interleaving QSW VRM," Virginia Polytechnic Institute and State University, Blacksburg, VA, pp. 973-978, Jan. 2001.

Wong, Pit-Leong, et al., "Performance Improvements of Interleaving VRM's with Coupling Inductors," IEEE Transactions on Power Electronics, vol. 16, No. 4, pp. 499-507, Jul. 2001.

U.S. Appl. No. 11/022,217.

U.S. Appl. No. 11/756,972.

* cited by examiner

US 8,068,355 B1

APPARATUS FOR ISOLATED SWITCHING POWER SUPPLY WITH COUPLED OUTPUT INDUCTORS

RELATED APPLICATIONS

This application is a continuation in part of U.S. patent application Ser. No. 11/756,972, filed Jun. 1, 2007, which is continuation of U.S. patent application Ser. No. 11/022,217, filed Feb. 17, 2005, now U.S. Pat. No. 7,239,530. Each of the aforementioned patent applications are incorporated herein by reference.

FIELD

This document relates generally to switching power converters, and particularly to transformer based, multiphase, DC-to-DC converters having coupled output inductors.

BACKGROUND

Switching DC-to-DC power converters having a multiphase coupled inductor topology are described in U.S. Pat. No. 6,362,986 to Shultz, et al., the disclosure of which is incorporated herein by reference. These converters have advantages, including reduced ripple current in the inductors and switches allowing reduced per-phase inductance or reduced switching frequency, over converters having conventional multi-phase DC-to-DC converter topologies. As a result, converters with magnetically coupled inductors have a superior transient response without an efficiency penalty compared with conventional multiphase topologies. This allows a significant reduction (>50%) in output capacitance resulting in smaller, lower cost power solutions. The switching DC-to-DC converter described in U.S. Pat. No. 6,362,986 is not ideal for large voltage step-down or step up ratios and does not provide for isolation between input and output rails.

There are many applications for DC-to-DC power converters where isolation between input and output rails is desirable. For example, AC power supplies and AC adapters of many devices rectify household AC current to provide a high DC voltage, driving a DC-to-DC converter that drives a load. Many such devices have metal parts accessible to a user; user safety requires that there be a high impedance, or electrical isolation, between either side of the AC power connection and the output power rails.

In other applications, DC-to-DC converters may need to provide a large voltage step-down from input to output. This step-down ratio can be achieved by cascading multiple converter stages or by using a single stage having a transformer to step down the input voltage. Transformer-based topologies are also useful to step the voltage up.

Transformer based DC-to-DC power converters between input and output rails typically have a set of input switches that convert input DC to high frequency AC current, a transformer for providing voltage step-down and/or electrical isolation while magnetically coupling AC power, and a set of output switches or rectifiers for generating the DC output.

In some DC-to-DC converters, isolation is not required but transformers are still desired in power supplies because of a high step-up or step-down ratio of the voltages between input and output.

Many (not all) transformer based multiphase DC-to-DC buck-type or buck-derived power converters have output inductors. These inductors are typically not magnetically coupled to each other.

SUMMARY

A multiphase DC-to-DC power converter has two or more sets of input switches, each set of input switches driving primary windings of at least one associated transformer. Each transformer has one or two secondary windings, the secondary windings feeding power through output switches or rectifiers through an associated output inductor into a common output filter. At least two of the output inductors are magnetically coupled.

In an embodiment, a multiphase DC-to-DC power converter includes an output filter and at least two phases. Each phase includes a set of input switches and at least one isolation transformer. Each isolation transformer has at least one primary winding inductively coupled to at least one secondary winding. Each primary winding is electrically coupled to the set of input switches of the phase. Each phase additionally includes a rectification circuit for each isolation transformer, where each rectification circuit is electrically coupled to the at least one secondary winding of a respective isolation transformer. Each phase further includes an output inductor for each rectification circuit, where each output inductor is electrically coupled to a respective rectification circuit and to the output filter. At least two of the output inductors of the DC-to-DC power converter are magnetically coupled together.

In an embodiment, a multiphase DC-to-DC power converter includes at least two sets of input switches. Each set of input switches generates a primary current waveform from an input power source, where each primary current waveform has a time varying component that is displaced in phase from a time varying component of each other primary current waveform. The power converter additionally includes an isolation transformer for each set of input switches, where each isolation transformer transforms a primary current waveform from a respective set of input switches into a secondary current waveform. The power converter further includes a rectification circuit for each isolation transformer, where each rectification circuit rectifies a secondary current waveform from a respective isolation transformer. The power converter additionally includes a common filter providing an output voltage node and at least one output inductor for each rectification circuit. Each output inductor couples a rectified secondary current waveform from a respective rectification circuit to the common filter. At least two of the output inductors of the DC-to-DC power converter are magnetically coupled together.

In an embodiment, a method of generating an output voltage from an input voltage source includes generating at least two primary current waveforms from the input voltage source. Each primary current waveform has a time varying component that is displaced in phase from the time varying component of each other primary current waveform. The method additionally includes transforming each primary current waveform into a plurality of secondary current waveforms using a plurality of isolation transformers. The method further includes rectifying each secondary current waveform and transmitting each rectified secondary current waveform through a respective output inductor to a common filter to produce the output voltage. At least two of the output inductors are magnetically coupled together.

DETAILED DESCRIPTION OF THE EMBODIMENTS

Figure 1:
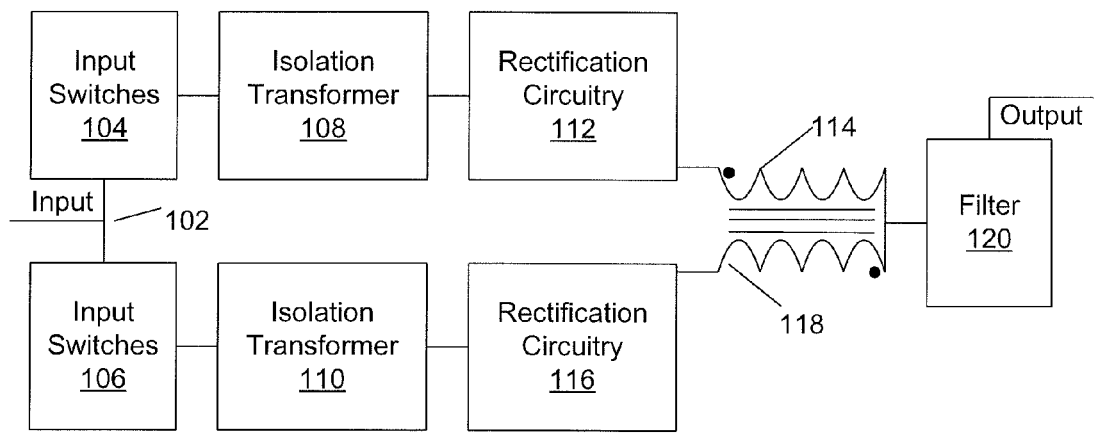
FIG. 1 is a simplified block diagram of a power converter.

Specific instances of an item may be referred to by use of a numeral in parentheses (e.g., input switches 1102(1)) while numerals without parentheses refer to any such item (e.g., input switches 1102).

A DC-to-DC power converter has an input 102. Power from the input is coupled through a first 104 and a second 106 set of input switches into primary windings of a first 108 and a second 110 isolation transformer. Each isolation transformer has at least one primary winding inductively coupled to at least one secondary winding.

The first set of input switches 104 drives the primary winding of the first 108 isolation transformer, and the second set of input switches 106 drives the primary winding of the second 110 isolation transformer. Primary windings of the first isolation transformer 108 and the second isolation transformer 110 are driven out of phase, as discussed below with reference to FIG. 4. Input switches 104, 106, as well as other switches or switching devices referred to herein, are typically electronic switching devices. These electronic switching devices typically include control and driving electronics together with MOSFETs, bipolar transistors, darlington transistors, VFETs, IGBTs, and/or other high current electronic switching devices as known in the semiconductor art.

The secondary winding of the first isolation transformer 108 drives through first rectification circuitry 112 to a first output inductor 114. Similarly, the secondary winding of the second isolation transformer 110 drives through second rectification circuitry 116 to second output inductor 118. First 114 and second 118 output inductors are magnetically coupled, and both drive a common filter 120. Filter 120 includes at least one capacitor.

Each rectification circuitry 112, 116, as well as other rectification circuitry or circuits referred to herein, may use diodes to provide one-way conduction. Where high efficiency is desired at low output voltages, rectification circuitry 112, 116, as well as other rectification circuitry or circuits referred to herein, typically uses switches (e.g., active switching transistors) to provide low voltage drop during conductive portions of each cycle, such as shown in FIGS. 2 and 3.

A first grouping of associated input switches 104, transformer 108, rectification circuitry 112, and output inductor 114 represent a first phase of the multiphase converter. Similarly, a second grouping of associated input switches 106, transformer 110, rectification circuitry 116, and output inductor 118 represent a second phase of the multiphase converter.

Figure 2:
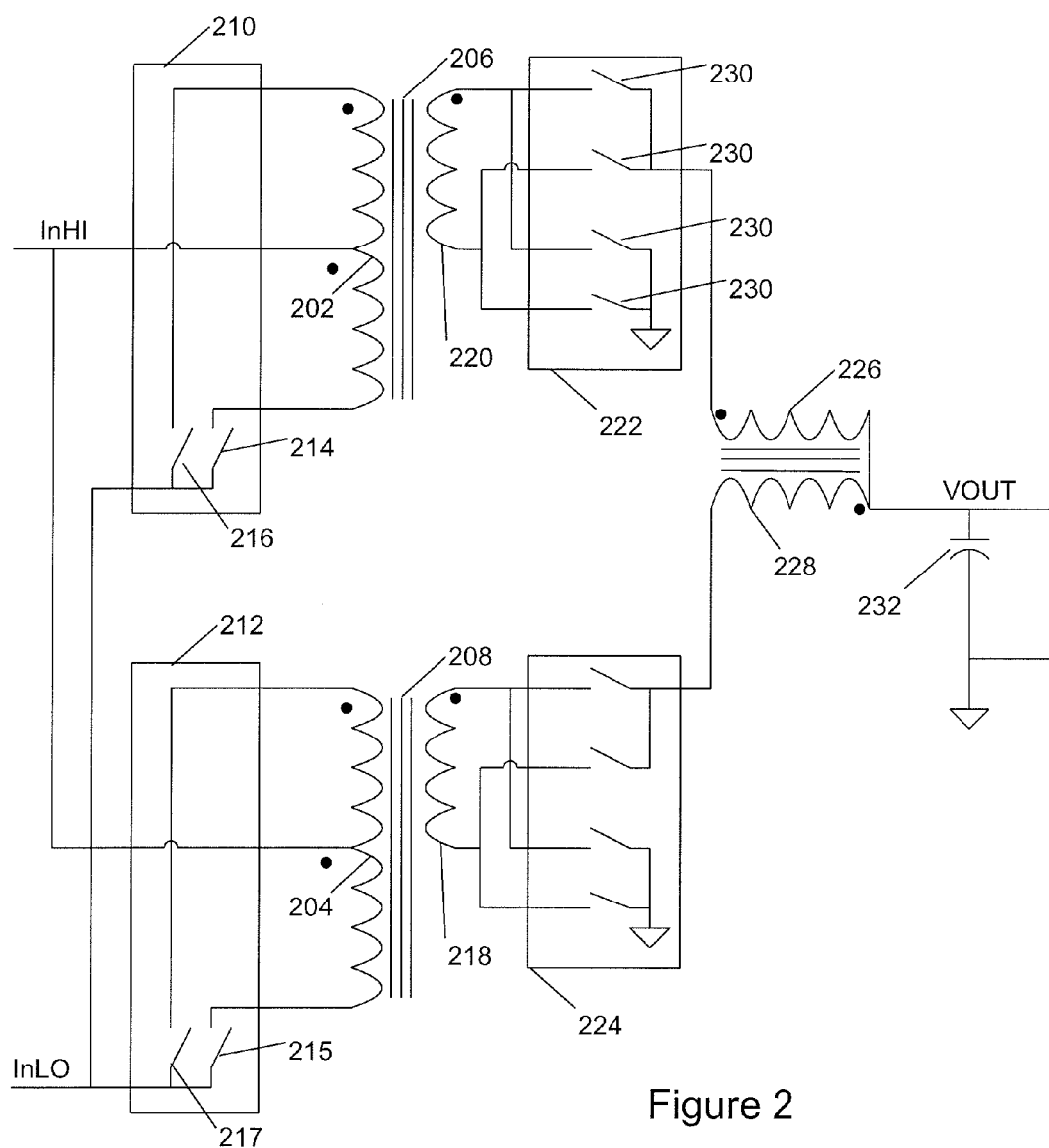
FIG. 2 is a simplified schematic diagram of a first implementation of the power converter.
Figure 3:
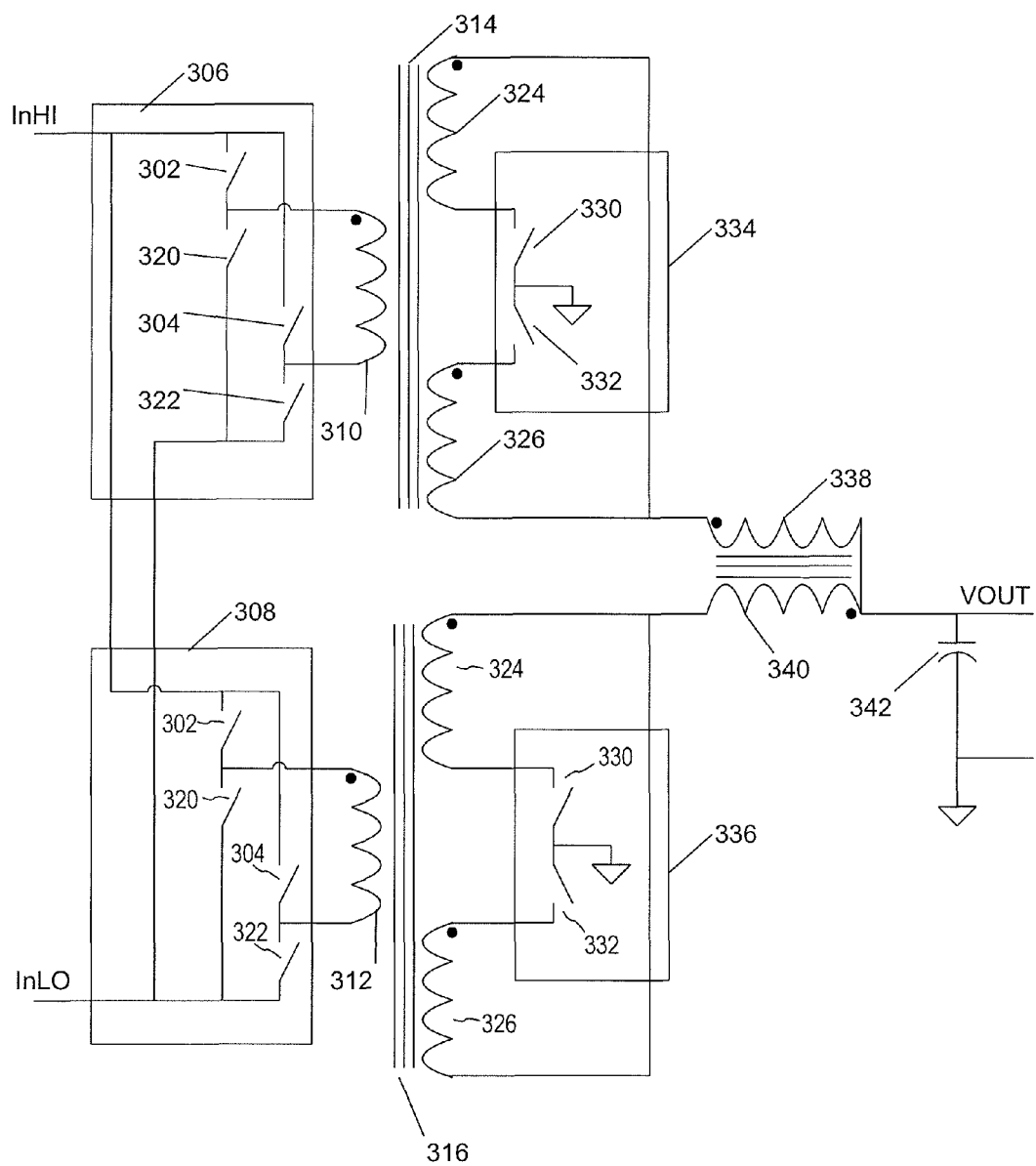
FIG. 3 is a simplified schematic diagram of a second implementation of the power converter.

FIG. 2 illustrates an embodiment having full-wave output rectification circuitry and push-pull, center-tapped, primary circuitry.

In this embodiment, a high voltage input InHI connects to a center tap of the primary winding 202, 204 of each isolation transformer 206, 208. Input switches 210, 212 each include switches 214, 216, or 215, 217, which in an embodiment are NFET transistors, for selectively connecting end terminals of the primary winding 202, 204 to low voltage input InLO.

The secondary winding 220, 218 of each isolation transformer 206, 208, connects through rectification circuitry 222, 224 to output inductors 226, 228. In this embodiment, each rectification circuitry 222, 224 incorporates four switching devices 230 connected in a full-wave bridge rectifier configuration. In alternative embodiments, switching devices 230 may be replaced by diodes. Output inductors 226, 228 are magnetically coupled, and together drive an output filter 232 to drive an output voltage VOUT. Output filter 232 incorporates at least one capacitor.

FIG. 3 illustrates an embodiment having an equivalent of center-tapped output rectification circuitry with full "bridge" primary circuitry.

In the embodiment of FIG. 3, a high voltage input InHI connects alternately through high-drive switches 302, 304 of input switches 306, 308 to an end of the primary winding 310, 312 of each isolation transformer 314, 316. Similarly, low voltage input InLO connects alternately through low-drive switches 320, 322 to ends of the primary winding 310, 312 of the isolation transformers 314, 316.

An end of each secondary windings 324, 326 of each isolation transformer 314, 316, connects alternately through switching devices 330, 332 of rectification circuitry 334, 336 to ground, while the other end of each secondary winding 324, 326 connects to output inductors 338, 340. In alternative embodiments, switching devices 330, 332 of the rectification circuitry 334, 336 may be replaced by diodes at some penalty in efficiency. Output inductors 338, 340 are magnetically coupled, and together drive a filter 342 to drive an output voltage VOUT.

The secondary circuitry of FIG. 3 is topologically equivalent in function to secondary circuitry having switching devices connected between ends of secondary windings 324, 326 and output inductors 338, 340 with center taps connected to ground. The circuit as illustrated with switching devices coupling windings to ground allows easy use of NFET switch devices.

In each embodiment, additional components such as snubbing diodes, predrive circuitry, current sensing circuitry, and control circuitry may exist in each primary and secondary circuit and are omitted from the drawings for clarity.

Figure 4:
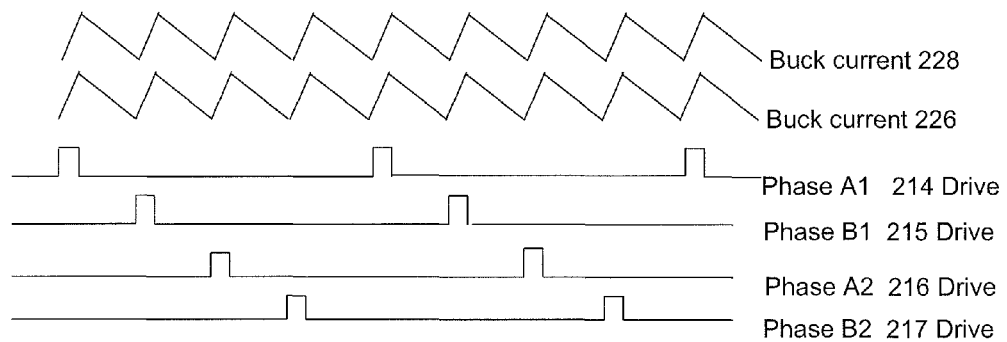
FIG. 4 is a timing diagram illustrating current in a magnetically coupled buck inductor of the converter.

During operation of the embodiment of FIG. 2, as illustrated in FIG. 4, the input switches 210, transformer 206, and rectification circuitry 222 are referred to as the phase-A half circuit, and input switches 212, transformer 208, and rectification circuitry 224 are referred to as the phase-B half circuit. In each cycle, switch 214 of input switches 210 briefly drives its primary winding 202 end low, then switch 215 of input switches 212 briefly drives its primary winding 204 end low.

Next, switch 216 of input switches 210 briefly drives its primary winding 202 end low, then switch 217 of input switches 212 briefly drives its primary winding 204 end low. Induced currents in secondary windings, as directed by the rectification circuitry, drives current into the associated output inductor each time a primary winding end is driven low. Current in output inductor 226 comes from secondary winding 220 when switch 214 or 216 turns on, and is induced from the other coupled output inductor 228 when switch 215 or 217 turns on. Similarly, current in output inductor 228 comes from secondary winding 218 when switch 215 or 217 turns on, and is induced from the other coupled output inductor 226 when switch 214 or 216 turns on. The net effect is to provide substantial current in both output inductors 226, 228 during each power pulse, regardless of whether the power pulse involved drive of phase-A transformer 206 or drive of phase-B transformer 208.

It is anticipated that the center-tapped primary circuitry of FIG. 2, may be combined with the center-tapped-equivalent secondary circuitry of FIG. 3; or the full-bridge primary circuitry of FIG. 3 may be combined with the full-bridge rectification secondary circuitry of FIG. 2.

Figure 5:
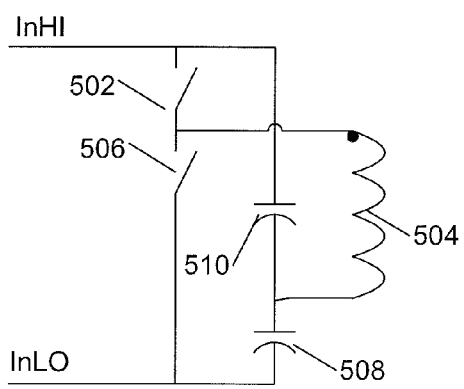
FIG. 5 is a simplified schematic diagram of an alternative embodiment of the primary circuit of the power converter.

In an alternative embodiment, as illustrated in FIG. 5, the primary portion of the converter uses a half-bridge configuration. The half-bridge configuration of FIG. 5 has a first switching device 502 for driving a first side of primary winding 504 of the transformer to a high input voltage InHI, and a second switching device 506 for driving the first side of primary winding 504 to InLO. The second side of primary winding 504 is connected to an effective AC ground through one 508 or two 510 capacitors. In the alternative embodiment, two or more primary circuits as illustrated in FIG. 5 are transformer-coupled to two or more secondary winding and secondary circuitry as illustrated in FIG. 2 or FIG. 3.

Figure 6:
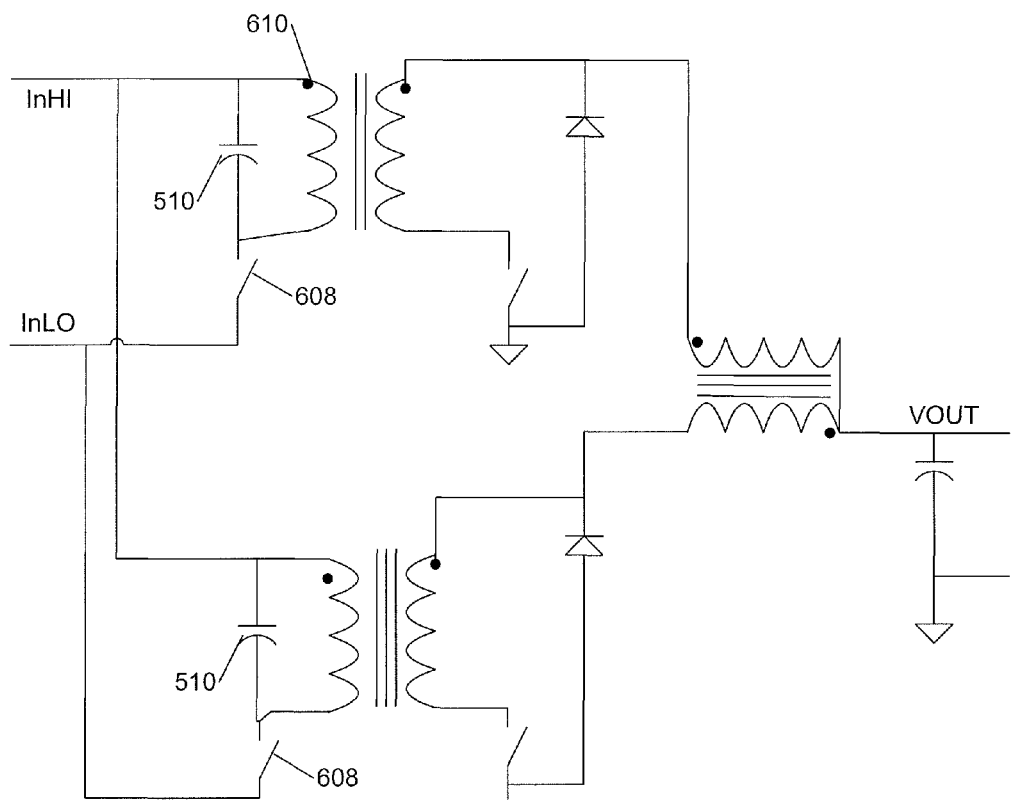
FIG. 6 is a simplified schematic diagram of yet another alternative embodiment of the power converter in forward configuration.

In yet another alternative embodiment, as illustrated in FIG. 6, the primary portion of the converter uses a forward configuration. The forward configuration of FIG. 6 has a single switching device 608 for driving a first side of primary winding 610 of the transformer to a low input voltage InLO, while a second side of primary winding 610 is tied to a high input voltage InHI. Transformer core reset circuitry is not shown for clarity. In this alternative embodiment, two or more primary circuits as illustrated in FIG. 6 are transformer-coupled to two or more secondary windings. Operation of the secondary circuit is discussed below with reference to FIG. 7.

Figure 7:
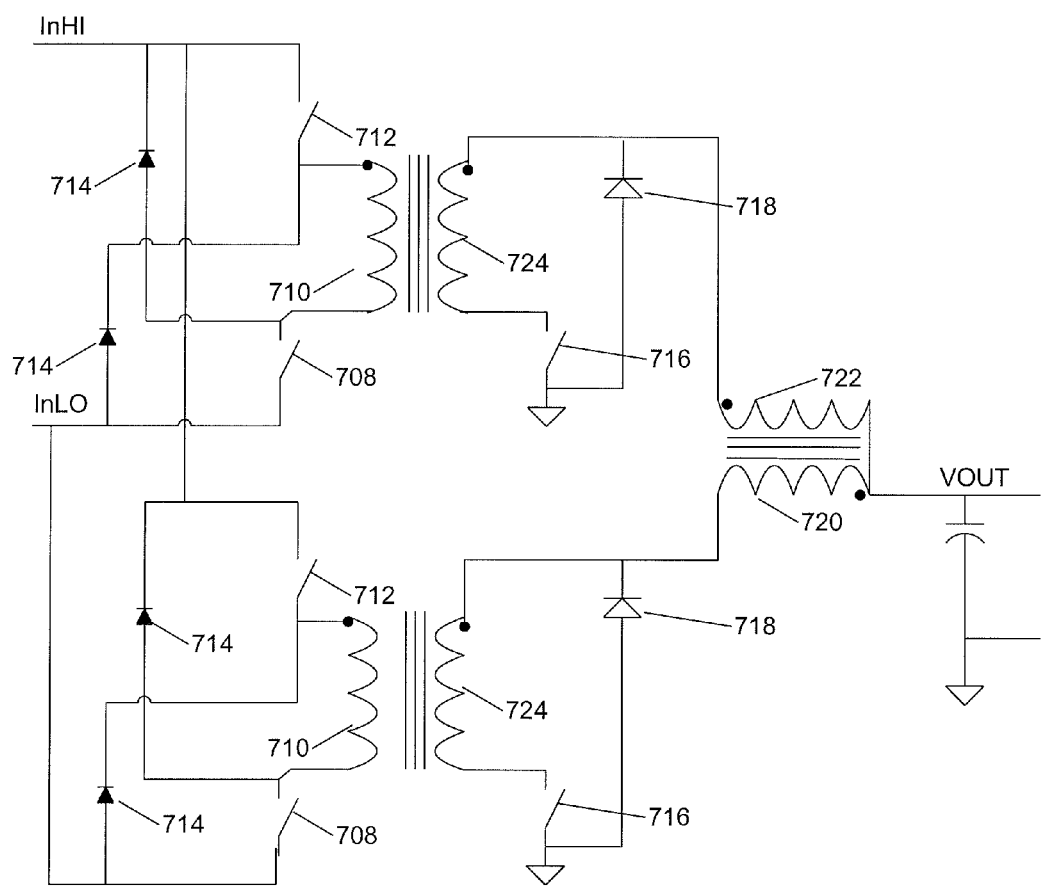
FIG. 7 is a simplified schematic diagram of still another alternative embodiment of the power converter in a variant of forward configuration.

In yet another alternative embodiment, as illustrated in FIG. 7, the primary portion of the converter uses an alternative forward configuration. The forward configuration of FIG. 7 has a switching device 708 for driving a first side of primary winding 710 of the transformer to a low input voltage InLO, while a second side of primary winding 710 is tied to a high input voltage InHI through a second switch 712. When this primary circuit is active, low and high switch devices 708, 712 together conduct current pulses; when low and high switch devices 708, 712 are off, residual current is dissipated through diodes 714 providing transformer core reset. In this alternative embodiment, two or more primary circuits as illustrated in FIG. 7 are transformer-coupled to two or more secondary windings.

The secondary circuit of FIGS. 6 and 7 has a switch 716 coupled between a first side of the secondary winding 724 and ground, and a diode 718 coupled to bypass the opposite side of the secondary winding 724 to ground. Switch 716, which alternately may be a diode, conducts during each power pulse to drive coupled output inductors 720 and 722. Diode 718, which alternately may be a switching device, of each phase conducts to allow current induced in an output inductor, such as inductor 720, by the power pulse of another phase driven into another output inductor, such as inductor 722.

Figure 8:
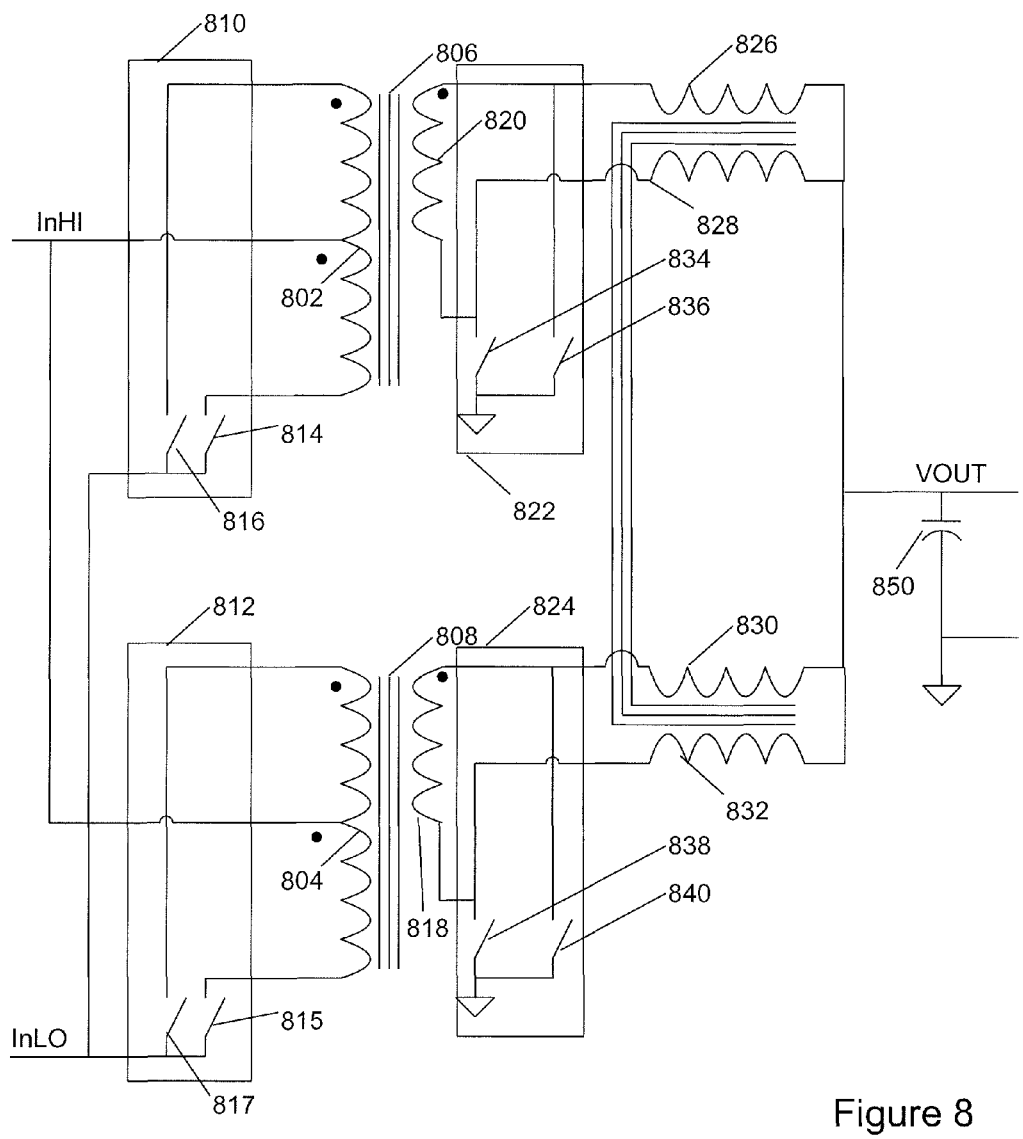
FIG. 8 is a simplified schematic diagram of still another alternative embodiment of the power converter having a current-doubler secondary circuit.

FIG. 8 illustrates an embodiment having push-pull, center-tapped, primary circuitry with current-doubler output rectification circuitry.

In this embodiment, high voltage input InHI connects to a center tap of the primary winding 802, 804 of each isolation transformer 806, 808. Input switches 810, 812 each include switches 814, 816, or 815, 817, which in an embodiment are NFET transistors, for selectively connecting end terminals of the primary winding 802, 804 to low voltage input InLO. Input switches 810, 812 are driven by suitable driving and control logic to induce an alternating current in the secondary windings 820, 818 of each isolation transformer.

The secondary winding 820, 818 of each isolation transformer 806, 808, connects through rectification circuitry 822, 824 to output inductors 826, 828, 830, 832. In this embodiment, each rectification circuitry 822, 824 incorporates two switching devices 834, 836, 838, 840 connected in a current-doubler configuration. Signals of a first polarity at each secondary winding 818, 820 drive through a first of the switching devices 834, 838, to provide power between signal ground and, through a first output inductor 826, 830 into the load. Signals of alternate polarity at each secondary winding 820, 818 drive through a second of the switching devices 836, 840, to provide power between signal ground and, through a second output inductor 828, 832 of each pair into the load. Output inductors 826, 828, 830, 832 are magnetically coupled; in an embodiment all four are wound together on the same core, and together drive an output filter 850 to drive an output voltage VOUT. Output filter 850 incorporates at least one capacitor as in other embodiments herein described.

Switches 834 and 836 are typically driven in an alternating fashion. The same applies to switches 838 and 840. By coupling the inductors 826 and 828 to inductors 830 and 832, and by introducing a phase shift between the phase A (switches 814, 816, 834, 836) and phase B (switches 815, 817, 838, 840), the benefits of reduced current ripple can be achieved.

It is anticipated that embodiments of the multiphase DC-to-DC converter having magnetically coupled output inductors may have more than two phases. In particular, four phase embodiments having four sets of input switches, four transformers, and four coupled output inductors; and six phase embodiments having six sets of input switches, six transformers, and six coupled output inductors will function. The output inductors may be coupled in pairs as illustrated, all output inductors may be coupled, or the output inductors may be coupled in other arrangements. The circuits illustrated herein in FIGS. 1, 2, 3, 6, 7, and 8 illustrate two phases for simplicity and clarity.

Figure 9:
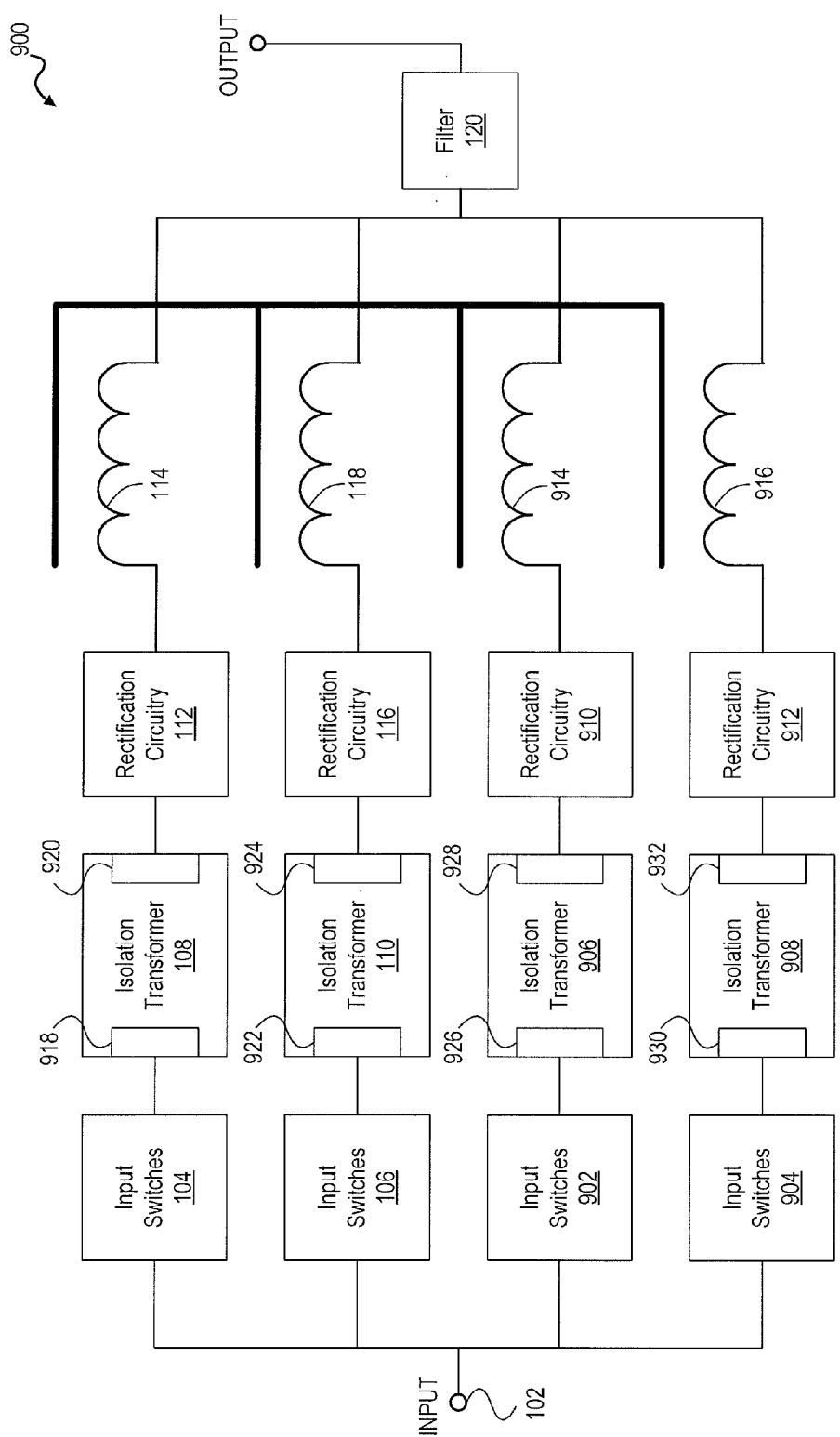
FIG. 9 is a block diagram of a power converter, according to an embodiment.

FIG. 9 shows one multiphase DC-to-DC power converter 900 having four phases. Phase one includes input switches 104, isolation transformer 108, rectification circuitry 112, and output inductor 114. Phase two includes input switches 106, isolation transformer 110, rectification circuitry 116, and output inductor 118. Phase three includes input switches 902, isolation transformer 906, rectification circuitry 910, and output inductor 914. Phase four includes input switches 904, isolation transformer 908, rectification circuitry 912, and output inductor 916.

Isolation transformers 108, 110, 906, and 908 include primary windings 918, 922, 926, and 930, respectively; isolation transformers 108, 110, 906, and 908 also include secondary windings 920, 924, 928, and 932, respectively. Output inductors 114, 118, 914, and 916, which are magnetically coupled, are connected to filter 120.

Figure 10:
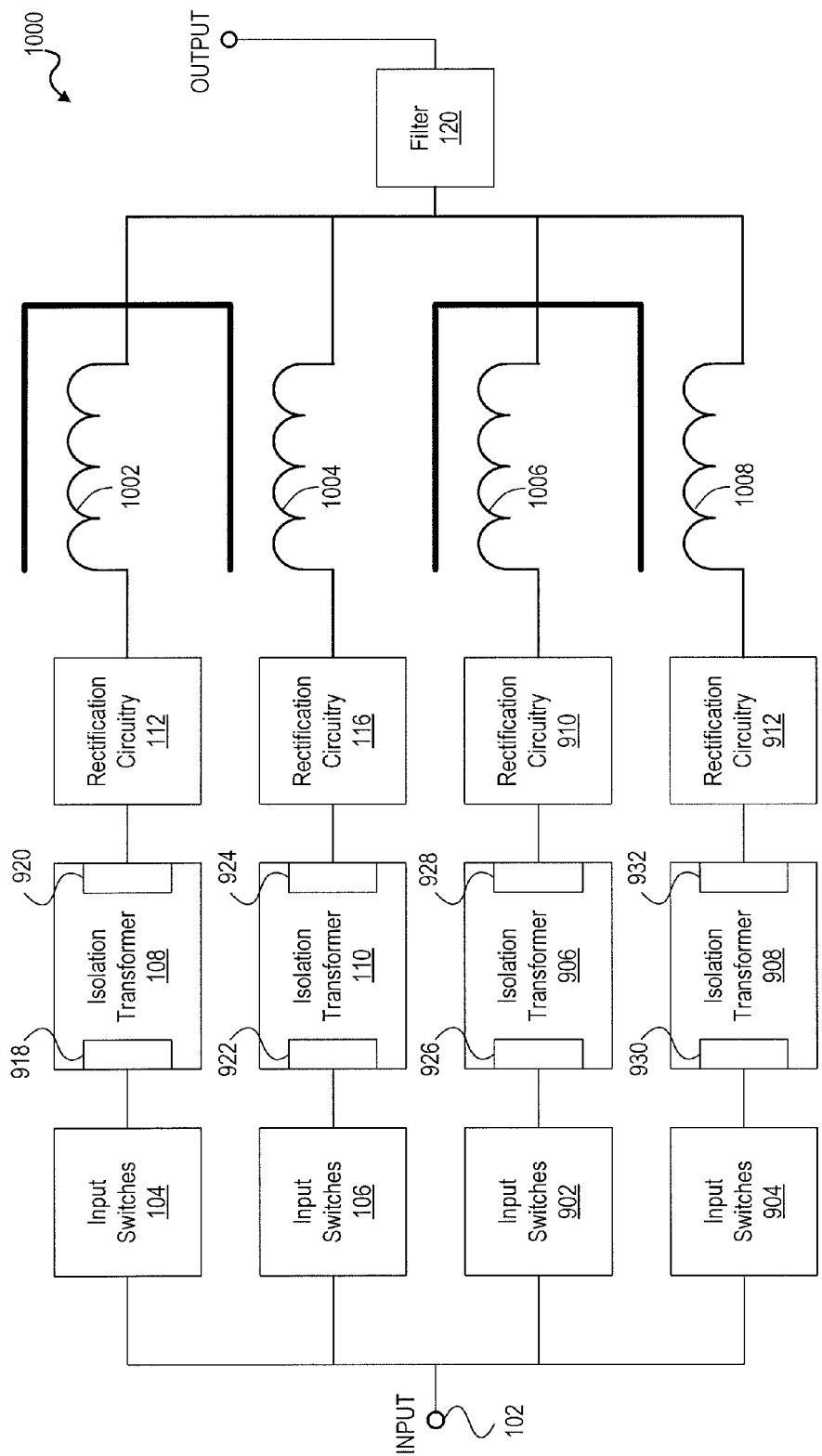
FIG. 10 is a block diagram of a power converter, according to an embodiment.

FIG. 10 shows another multiphase DC-to-DC power converter 1000 having four phases. DC-to-DC power converter 1000 is similar to DC-to-DC power converter 900 of FIG. 9. However, sub groups of output inductors are magnetically coupled together in DC-to-DC converter 1000. For example, output inductors 1002 and 1004 may be magnetically coupled together, and output inductors 1006 and 1008 may be magnetically coupled together, as shown in FIG. 10.

Figure 11:
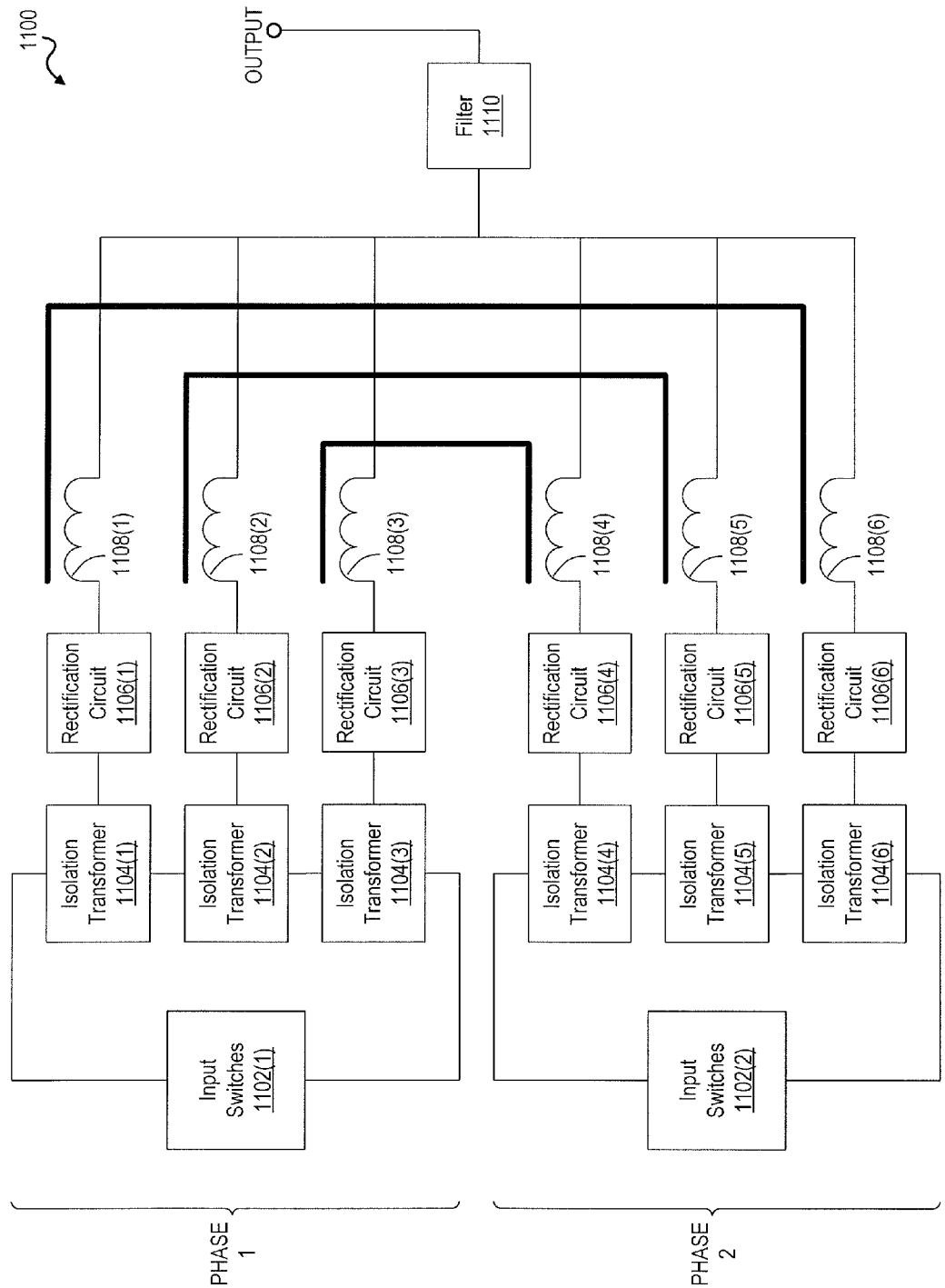
FIG. 11 is a block diagram of a power converter, according to an embodiment.

FIG. 11 shows one multiphase DC-to-DC power converter 1100 where each set of input switches 1102 generates a respective primary current waveform from one or more input power sources (not shown) and drives a plurality of isolation transformers 1104. Specifically, each phase of DC-to-DC power converter 1100 includes a set of input switches 1102 electrically coupled to at least one respective primary winding of each of a plurality of isolation transformers 1104. Each set of input switches 1102 are, for example, operated out of phase with respect to each other set of input switches to generate a primary current waveform having a time varying component that is displaced in phase from a time varying component of each other primary current waveform.

Each set of input switches 1102 may be driven from a common input power source. Alternately, a plurality of input power sources may be used to drive sets of input switches 1102. For example, each set of input switches 1102 could be driven by a respective input power source.

Each isolation transformer 1104 includes at least one secondary winding inductively coupled to the transformer's at least one primary winding. Each isolation transformer 1104's at least one secondary winding is electrically coupled to a rectification circuit 1106 associated with the transformer for rectifying the transformer's secondary current waveforms. Each rectification circuit 1106 is electrically coupled to at least one respective output inductor 1108, and each output inductor 1108 is electrically coupled to a common output filter 1110.

Two or more of output inductors 1108 are magnetically coupled together. In the example of FIG. 11, output inductor 1108(1) is magnetically coupled to output inductor 1108(6), output inductor 1108(2) is magnetically coupled to output inductor 1108(5), and output inductor 1108(3) is magnetically coupled to output inductor 1108(4). However, output inductors 1108 may be magnetically coupled together in other configurations. For example, in alternate embodiments of DC-to-DC power converter 1100, groups of three output inductors 1108 are magnetically coupled together, or all output inductors 1108 are magnetically coupled together.

FIG. 11 shows DC-to-DC power converter 1100 as having two phases. The first phase includes set of input switches 1102(1), isolation transformers 1104(1)-1104(3), rectification circuits 1106(1)-1106(3), and output inductors 1108(1)-1108(3). The second phase includes set of input switches 1102(2), isolation transformers 1104(4)-1104(6), rectification circuits 1106(4)-1106(6), and output inductors 1108(4)-1108(6). Alternate embodiments of DC-to-DC power converter 1100 include three or more phases. Additionally, although FIG. 11 shows each phase as including three isolation transformers 1104 and associated rectification circuits 1106 and output inductors 1108, alternate embodiments include only two of such components per phase or more than three of such components per phase. Furthermore, each phase need not have the same number of isolation transformers 1104 and associated rectification circuits 1106 and output inductors 1108.

Figure 12:
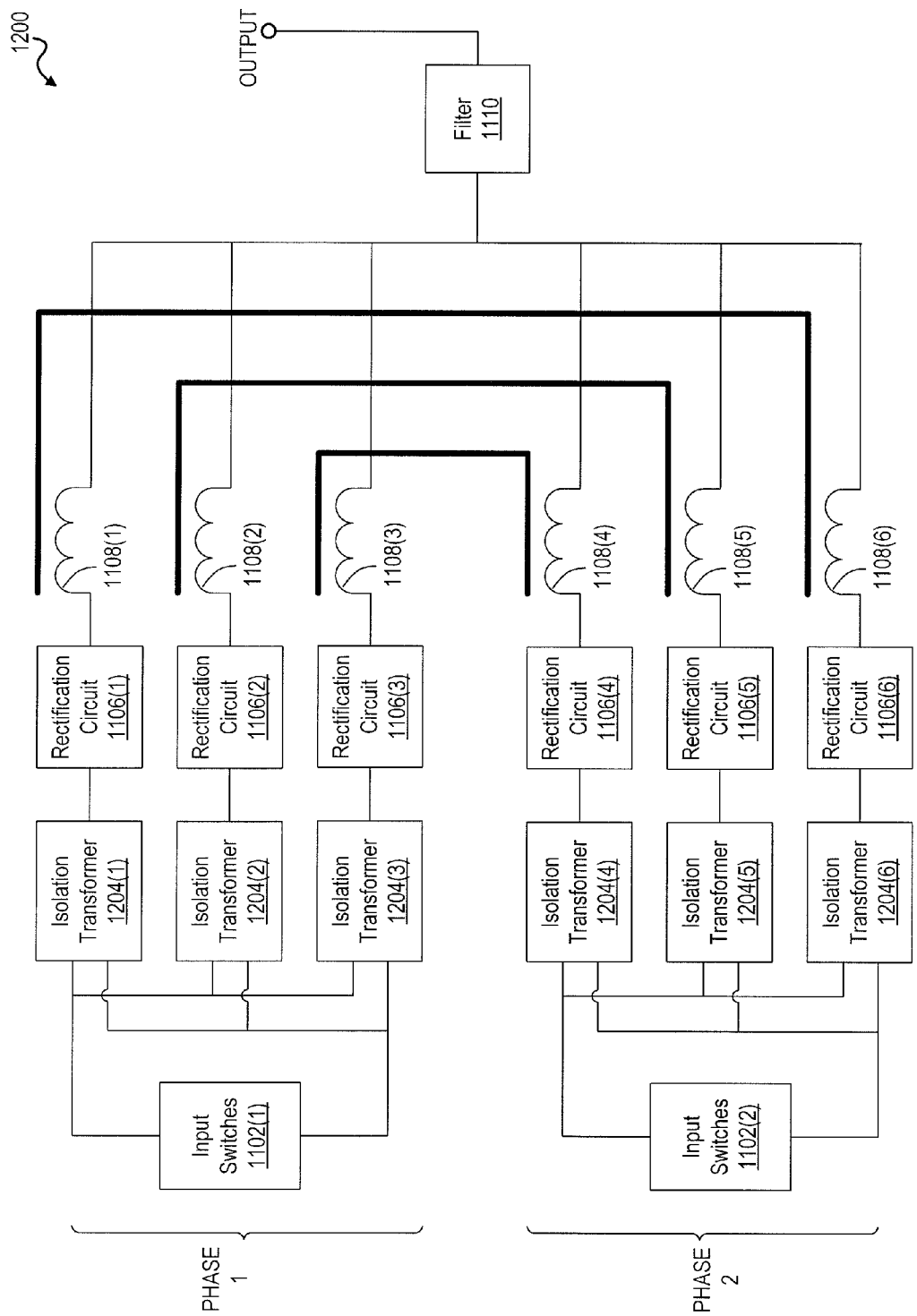
FIG. 12 is a block diagram of a power converter, according to an embodiment.

In a given phase, the one or more primary windings of each isolation transformer may be electrically coupled in series and/or in parallel with the set of input switches 1102. FIG. 11 shows an example of a series connection—specifically, the primary windings of each isolation transformer 1104 of a given phase are electrically coupled in series. In contrast, FIG. 12 shows an example of a parallel connection. In particular, FIG. 12 shows one DC-to-DC power converter 1200 where the primary windings of each isolation transformer 1204 of a given phase are electrically connected in parallel with a set of input switches 1102 for the phase. DC-to-DC power converter 1200 is the same as DC-to-DC power converter 1100 with the exception of converter 1200's primary windings being connected in parallel while converter 1100's windings are connected in series.

A series primary winding connection (e.g., as shown in FIG. 11) may be preferred when an input voltage source's magnitude is much higher than the DC-to-DC power converter's output voltage in order to reduce the turns ratio of each isolation transformer. A parallel primary winding connection (e.g., as shown in FIG. 12) may be preferred when it is desired to reduce the current rating of each isolation transformer and its associated rectification circuit and output inductor.

It should be noted that DC-to-DC power converter 1200 could be modified to have a ganged or synchronous configuration. In such embodiments, each isolation transformer 1204 is driven by a respective set of input switches 1102, and each set of input switches 1102 of a given phase operates in a synchronized manner (i.e., each set of input switches of a given phase turns on and off at the same time).

In a given phase of DC-to-DC power converter 1100 or 1200, each primary winding is, for example, electrically coupled with the set of input switches 1102 to form one of the following primary side topologies: (1) a push-pull, center tapped topology, such as that of FIG. 2 or 8; (2) a full bridge topology, such as that of FIG. 3; (3) a half bridge topology, such as that of FIG. 5; or (4) a forward topology, such as that of FIG. 6 or 7. Rectification circuits 1106, for example, are configured to form one of the following topologies: (1) a full-wave topology, such as that of FIG. 2; (2) a center-tapped topology, such as that of FIG. 3; (3) a current doubler topology, such as that of FIG. 8, or (4) the secondary side topology of FIG. 6 or 7.

Figure 13:
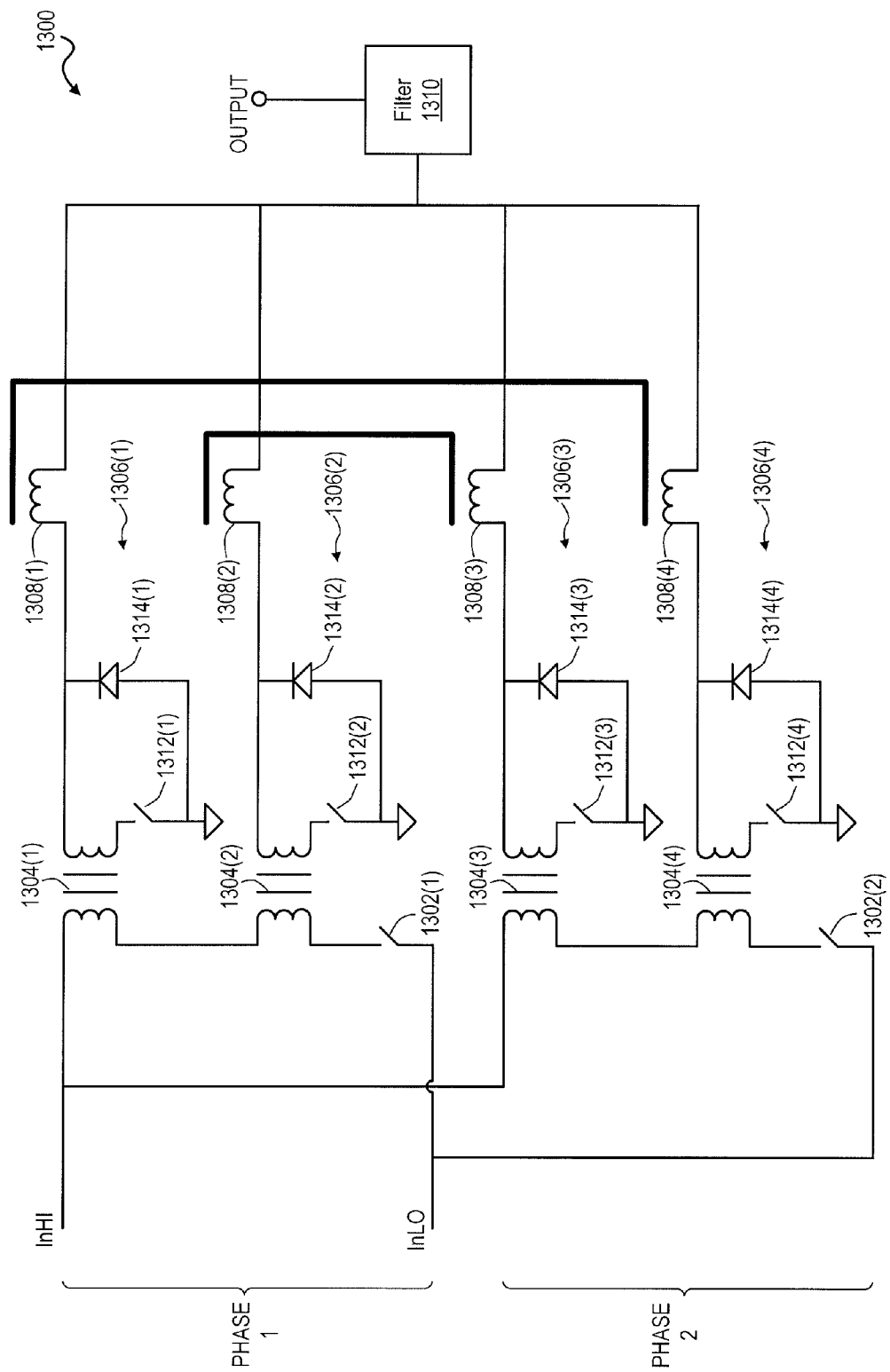
FIG. 13 is a simplified schematic diagram of one embodiment of the power converter of FIG. 11.

FIG. 13 shows one embodiment of DC-to-DC power converter 1100 having primary circuits configured to have a forward topology. In particular, FIG. 13 shows DC-to-DC power converter 1300, which is shown as having two phases, where each phase includes two isolation transformers 1304 having their primary windings connected in series. Alternate embodiments of DC-to-DC power converter 1300 have three or more phases and/or three or more isolation transformers 1304 per phase.

In each phase, each isolation transformer 1304's primary windings are electrically coupled in series with a switch 1302 and the InHI and InLO rails. Each switch 1302 is an embodiment of a set of input switches 1102 of FIG. 11, and each switch 1302 may be operated out of phase with respect to each other switch 1302.

The secondary winding of each transformer 1304 is electrically coupled to a respective rectification circuit 1306 including a switch 1312 and a diode 1314. Each switch 1312 is closed when its respective isolation transformer is powering its respective output inductor 1308. Each diode 1314 conducts when current is induced in its associated output inductor 1308 from another magnetically coupled output inductor. Switches 1312 could be replaced with diodes in order to reduce cost and complexity, and diodes 1314 could be replaced with switches to increase efficiency.

Each rectification circuit 1306 is electrically coupled to a respective output inductor 1308. Each output inductor 1308 is electrically coupled to a common output filter 1310, which may include at least one capacitor. At least two of the output inductors of DC-to-DC power converter 1300 are magnetically coupled together. For example, FIG. 13 shows output inductor 1308(1) being magnetically coupled to output inductor 1308(4), and output inductor 1308(2) being magnetically coupled to output inductor 1308(3). However, output inductors 1308 could be magnetically coupled in different configurations. For example, all output inductors 1308 could be magnetically coupled together.

Figure 14:
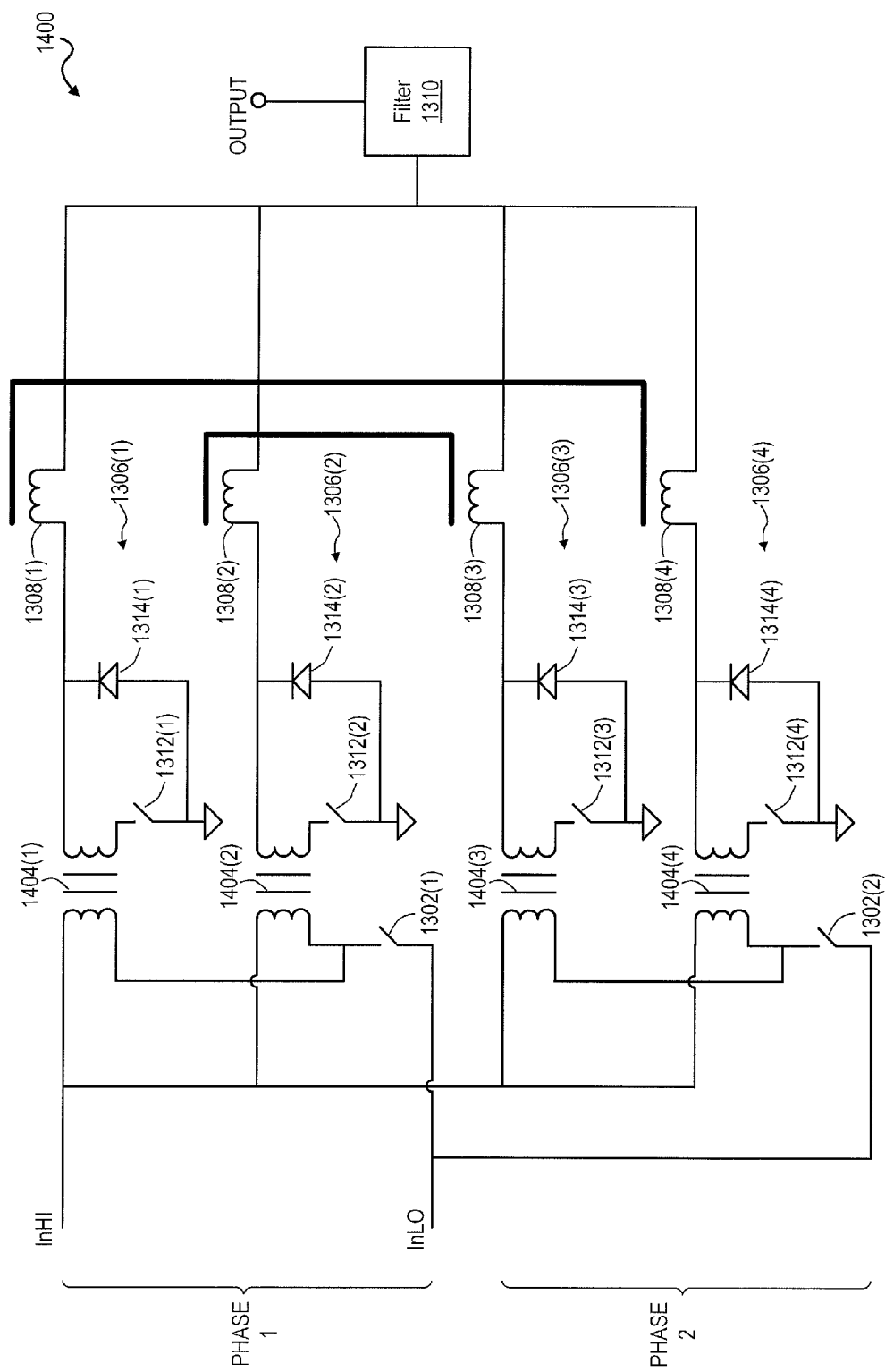
FIG. 14 is a simplified schematic diagram of one embodiment of the power converter of FIG. 12.

FIG. 14 shows an embodiment of DC-to-DC power converter 1200 having primary circuits configured to have a forward topology. In particular, FIG. 14 shows DC-to-DC power converter 1400, which is similar to DC-to-DC power converter 1300 of FIG. 13. However, in DC-to-DC converter power 1400, the primary windings of isolation transformers 1404 are connected in parallel between InHI and a switch 1302. Similar to DC-to-DC power converter 1300, the number of phases and/or number of isolation transformers 1404 per phase may be varied.

Magnetically coupled inductors referred to herein preferably have a coupling coefficient 6 that is greater than or equal to 3, where $\sigma = Lm/L_1$ as defined in column 8 of U.S. Pat. No. 6,362,986 to Shultz, et al. Such values of σ may advantageously improve converter performance. However, it should be noted that σ can be less than three.

While the invention has been particularly shown and described with reference to particular embodiments thereof, it will be understood by those skilled in the art that various other changes in the form and details may be made without departing from the spirit and scope of the invention. It is to be understood that various changes may be made in adapting the invention to different embodiments without departing from the broader inventive concepts disclosed herein and comprehended by the claims that follow.

What is claimed is:

1. A multiphase DC-to-DC power converter, comprising an output filter; and
at least two phases, each phase including:
a set of input switches,
at least one isolation transformer, each isolation transformer having at least one primary winding inductively coupled to at least one secondary winding, each primary winding being electrically coupled to the set of input switches of the phase,
a rectification circuit for each isolation transformer, each rectification circuit being electrically coupled to the at least one secondary winding of a respective isolation transformer, and
an output inductor for each rectification circuit, each output inductor being electrically coupled to a respective rectification circuit and to the output filter,
at least two of the output inductors of the DC-to-DC power converter being magnetically coupled together.

2. The multiphase DC-to-DC power converter of claim 1, each phase including at least two isolation transformers.

3. The multiphase DC-to-DC power converter of claim 2, the primary windings of each phase being electrically coupled in series with the set of input switches of the phase.

4. The multiphase DC-to-DC power converter of claim 2, the primary windings of each phase being electrically coupled in parallel with the set of input switches of the phase.

5. The multiphase DC-to-DC power converter of claim 1, at least one phase forming a push-pull, center-tapped primary circuit.

6. The multiphase DC-to-DC power converter of claim 1, at least one phase forming a full-bridge primary circuit.

7. The multiphase DC-to-DC power converter of claim 1, at least one phase forming a half-bridge primary circuit.

8. The multiphase DC-to-DC power converter of claim 1, at least one phase forming a forward converter primary circuit.

9. The multiphase DC-to-DC power converter of claim 1, at least one rectification circuit being a full-wave output rectification circuit.

10. The multiphase DC-to-DC power converter of claim 1, at least one rectification circuit being a center-tapped output rectification circuit.

11. The multiphase DC-to-DC power converter of claim 1, at least two rectification circuits and their respective output inductors collectively forming a current-doubler output rectification circuit.

12. A multiphase DC-to-DC power converter, comprising:
at least two sets of input switches, each set of input switches generating a primary current waveform from an input power source, each primary current waveform having a time varying component that is displaced in phase from a time varying component of each other primary current waveform;
a first isolation transformer for each set of input switches, each first isolation transformer transforming a primary current waveform from a respective set of input switches into a secondary current waveform;
a first rectification circuit for each first isolation transformer, each first rectification circuit rectifying a secondary current waveform from a respective first isolation transformer;
a common filter providing an output voltage node; and
at least one output inductor for each first rectification circuit, each output inductor coupling a rectified secondary current waveform from a respective first rectification circuit to the common filter,
at least two of the output inductors of the multiphase DC-to-DC power converter being magnetically coupled together.

13. The multiphase DC-to-DC power converter of claim 12, a set of input switches and a first isolation transformer collectively forming a push-pull, center-tapped primary circuit.

14. The multiphase DC-to-DC power converter of claim 12, a set of input switches and a first isolation transformer collectively forming a full-bridge primary circuit.

15. The multiphase DC-to-DC power converter of claim 12, a set of input switches and a first isolation transformer collectively forming a half-bridge primary circuit.

16. The multiphase DC-to-DC power converter of claim 12, a set of input switches and a first isolation transformer collectively forming a forward converter primary circuit.

17. The multiphase DC-to-DC power converter of claim 12, at least one first rectification circuit being a full-wave output rectification circuit.

18. The multiphase DC-to-DC power converter of claim 12, at least one first rectification circuit being a center-tapped output rectification circuit.

19. The multiphase DC-to-DC power converter of claim 12, at least two first rectification circuits and their respective output inductors collectively forming a current-doubler output rectification circuit.

20. The multiphase DC-to-DC power converter of claim 12, further comprising:
at least one second isolation transformer for each set of input switches, each second isolation transformer transforming a primary current waveform from a respective set of input switches into a secondary current waveform;

a second rectification circuit for each second isolation transformer, each second rectification circuit rectifying a secondary current waveform from a respective second isolation transformer; and at least one output inductor for each second rectification circuit, each output inductor coupling a rectified secondary current waveform from a respective second rectification circuit to the common filter.

21. The multiphase DC-to-DC power converter of claim 20, each first isolation transformer having at least one primary winding electrically coupled in series with at least one primary winding of a respective at least one second isolation transformer.

22. The multiphase DC-to-DC power converter of claim 20, each first isolation transformer having at least one primary winding electrically coupled in parallel with at least one primary winding of a respective at least one second isolation transformer.

23. A method of generating an output voltage from an input voltage source, comprising:

generating a least two primary current waveforms from the input voltage source, each primary current waveform having a time varying component that is displaced in phase from the time varying component of each other primary current waveform;

transforming each primary current waveform into a plurality of secondary current waveforms using a plurality of isolation transformers;

rectifying each secondary current waveform; and transmitting each rectified secondary current waveform through a respective output inductor to a common filter to produce the output voltage, at least two of the output inductors being magnetically coupled together.

* * * * *